May 15, 1951     H. OSTERBERG ET AL     2,553,108
PHASE MICROSCOPY WITH REFLECTED LIGHT
Filed Aug. 10, 1946     2 Sheets-Sheet 1
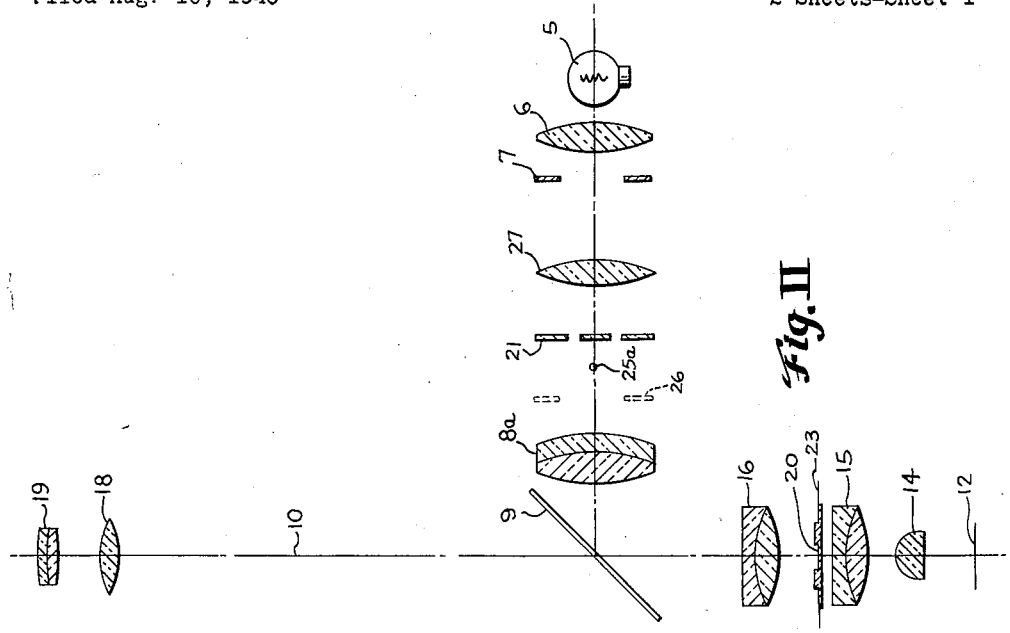
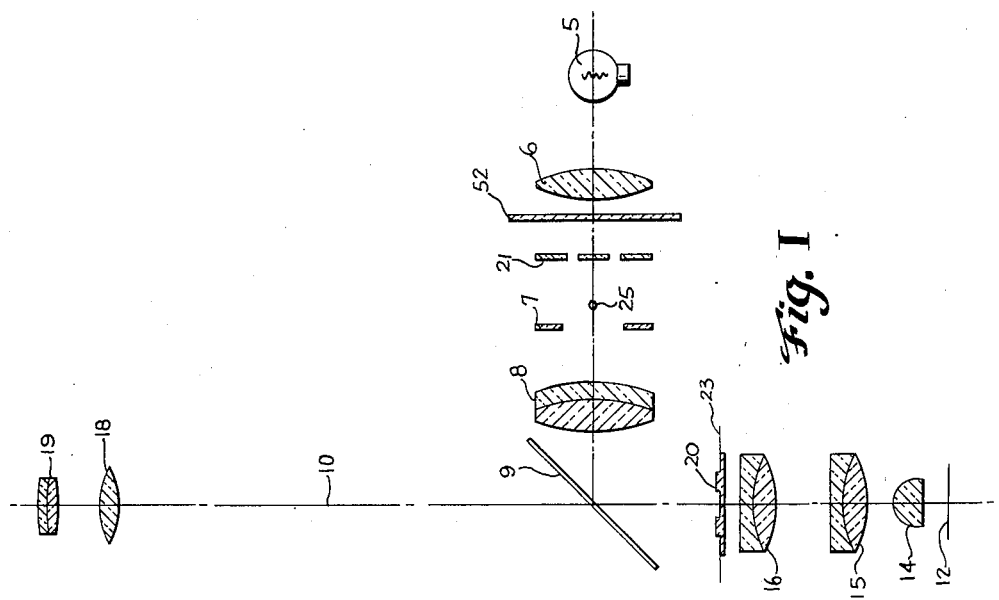
INVENTORS
HAROLD OSTERBERG
HELEN JUPNIK
BY Herbert C. Kimball
ATTORNEY May 15, 1951  H. OSTERBERG ET AL  2,553,108
PHASE MICROSCOPY WITH REFLECTED LIGHT
Filed Aug. 10, 1946  2 Sheets-Sheet 2
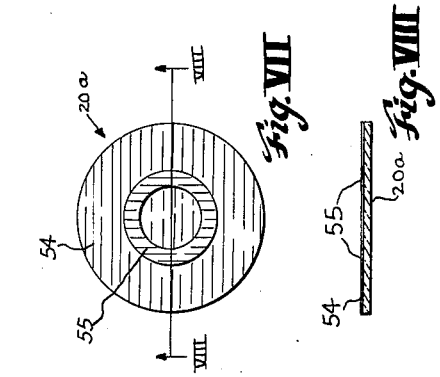
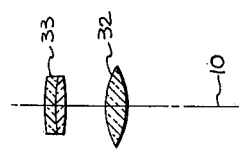
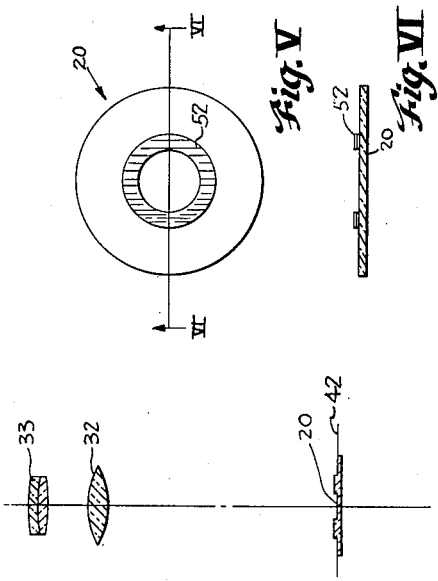
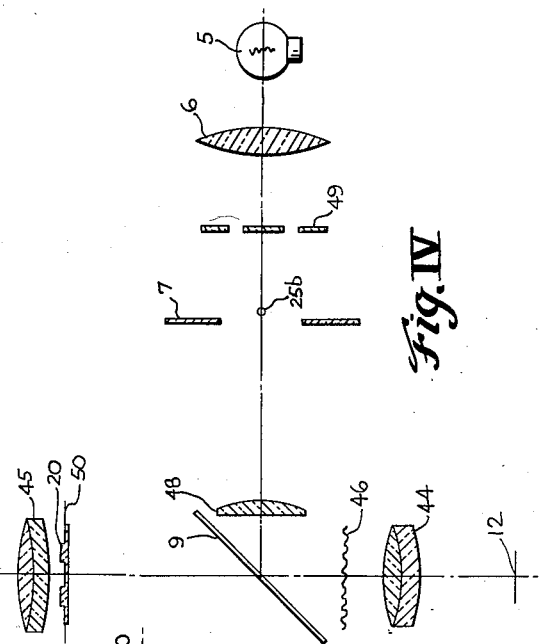
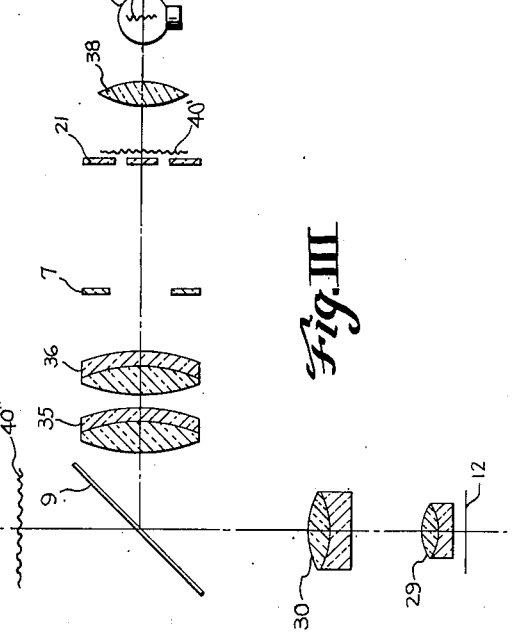
INVENTORS
HAROLD OSTERBERG
HELEN JUPNIK
BY Herbert C. Kimball
ATTORNEY Patented May 15, 1951

2,553,108

UNITED STATES PATENT OFFICE 2,553,108

PHASE MICROSCOPY WITH REFLECTED LIGHT

Harold Osterberg and Helen Jupnik, Buffalo, N. Y., assignors to American Optical Company, Southbridge, Mass., a voluntary association of Massachusetts Application August 10, 1946, Serial No. 689,704

3 Claims. (Cl. 88—39)

This invention relates to widening the usefulness of the technique of improving contrast in the image of an object being viewed by means of a microscope of the type discussed in German Patent No. 636,168 and also in the copending application of Osterberg and Schrader, Serial No. 456,726, filed August 28, 1942, and issued September 23, 1947, as Patent No. 2,427,689. This technique has become known to microscopists as phase contrast microscopy and the instruments employed therefor, known as phase microscopes.

The present invention has for its purpose the extension of the above-mentioned microscope technique to the study of opaque or semi-opaque objects which possess strong specular rather than diffuse reflection of the incident light beam. To this same class of objects belong smears or deposits on a highly polished specularly reflecting surface, such as silver, where the observer wishes in this way to examine droplets of an emulsion, a bacterial suspension, or a diatom. Such objects do not lend themselves to illumination by light transmitted through the object. It is, accordingly, an object of our invention to adapt the above-mentioned technique of phase microscopy to usefulness in those relations where light is directed upon the surface of the object or specimen being examined, this light being reflected from such surface into the optics of the microscope.

In the accompanying drawings which illustrate our invention, Fig. I is a diagrammatic view of a microscope arranged in accordance with one form of our invention for observation of an opaque or semi-opaque object, the view being principally in section along the optical axis of the system.

Fig. II is a diagrammatic view of a microscope arranged in accordance with a second form of our invention for observation of an opaque or semi-opaque object, the view being principally in section along the optical axis of the system.

Fig. III is a diagrammatic view of a microscope arranged in accordance with a third form of our invention for observation of an opaque or semi-opaque object, the view being principally in section along the optical axis of the system.

Fig. IV is a diagrammatic view of a microscope arranged in accordance with a fourth form of our invention for observation of an opaque or semi-opaque object, the view being principally in section along the optical axis of the system.

Fig. V is a face view of a light modifying plate.

Fig. VI is a sectional view on line 6—6 of Fig. V.

Fig. VII is a face view of another form of light modifying plate.

Fig. VIII is a sectional view on line 8—8 of Fig. VII.

In the above-mentioned German Patent No. 636,168 a special adaptation of the usual microscope condenser is employed which imparts a predetermined contour such as a slit or annulus to the cone of light illuminating the transparent object under observation. If this condensing lens system and the microscope objective be considered as constituting one composite lens system, the above-mentioned aperture of predetermined contour is disposed at the entrance pupil of this composite system, and light modifying means for controlling contrast in the image being produced by the objective are disposed at the exit pupil of this composite system.

Such modification of contrast in the image is brought about, in accordance with the principles of the technique of this German patent, by interference between the deviated and undeviated spectra of rays originating in the aperture of predetermined contour and traversing the object plane of the instrument. The light modifying means (at the exit pupil) impart a differential in a wave characteristic, that is a variation in amplitude ratio or in phase difference or in both, between the deviated and undeviated spectra.

Although this patent names the metallograph as a possible application of the new technique, no solution is given of how such application may be made. We have found a practical solution of this problem of applying such a phase contrast technique to the observation of opaque and semi-opaque specimens by considering the specularly reflecting surface of the specimen as correlating the lens system by which light is directed upon the specimen with the lens system by which an image of the specimen is formed. When these lens systems are so correlated, an aperture at the entrance pupil of the resulting composite system will be imaged at the exit pupil of this composite system. By arranging at the exit pupil light modifying means for imparting a differential in a wave characteristic, i. e., a variation in amplitude ratio or a phase difference or both, between the deviated and undeviated spectra, improved detail in the image of the surface of the opaque or semi-opaque specimen may often be obtained.

These requirements can be most readily understood after consideration of the device or apparatus which is to be employed for supplying illumination to impinge upon the reflecting surface of the object to be observed. A device known as a vertical illuminator is generally employed for this purpose, of which several examples are shown in the drawings accompanying the present application. In general, the light source and lenses functioning to concentrate light from this source upon the object are arranged at an angle to the optical axis of the microscope, with a semi-reflecting element such as a dividing mirror or prism for directing upon the object the angularly directed beam of light thus provided. The illuminated area of the object is limited in size by a field stop iris so placed as to be imaged approximately upon the object to be observed. We have found that improved results are obtained if the entrance pupil, at which the aperture is located, is on the side of this field stop (or the image of the field stop) toward the light source.

Bearing in mind that the above-mentioned light control means should be at the exit pupil of the composite system made up of the lens system for directing light upon the object and of the lens system for forming an image of the object, it becomes of interest to correlate these two lens systems with a view to favorable conditions of illumination. The light control means are both of the phase change variety and the absorption variety; and if the exit pupil falls below the semi-reflecting mirror, a substantial amount of light passing to the object may be absorbed by the latter variety. This is not true if the exit pupil, according to the optical design, falls above the semi-reflecting mirror. These considerations will now be discussed more in detail in connection with the examples illustrated in the accompanying drawings.

In Fig. I is shown an arrangement of the optical system of a microscope for adapting this technique to the examination of an opaque or semi-opaque specimen, the light control means being arranged for the sake of simplicity below the semi-reflecting mirror. A source of illumination such as an electric lamp bulb has been conventionally illustrated at 5, from which light passes through a condensing lens 6, a field stop iris 7, and a field lens 8 to be reflected by a semi-transparent mirror or plate 9 along the axis 10 of the microscope towards the object 12.

This object is observed by means of an objective which in Fig. I is conventionally shown as including lenses 14, 15, and 16, and an eyepiece which is conventionally shown as including lenses 18 and 19. To improve the contrast in the image thus observed, light control means such as a series of light modifying plates disclosed and claimed in the Osterberg and Schrader application 456,726, now Patent No. 2,427,689, or continuously variable means disclosed and claimed in the Osterberg and Bennett application Serial No. 681,066 filed July 2, 1946, and issued as Patent No. 2,516,905 dated August 1, 1950, cooperate with the objective 14, 15, 16. As representative of such flight control means, a light modifying plate 20 for changing the phase and/or amplitude of an annular zone is used in cooperation with a ring stop 21.

As mentioned above, it is one of the requirements of this technique that the light modifying means be disposed at the exit pupil 23 of the composite system and that the ring stop or aperture means be disposed at the entrance pupil of the composite system. Accordingly, the ring stop 21 will appear to be superimposed on the plate 20 when the microscope is focussed upon the object 12.

The arrangement of the microscope optical system shown in Fig. I embodies one of the features which we prefer in the designing of such a system, in that the ring stop or aperture means 21 is on the remote side of the field stop iris from the field lens. It will be noted that the field stop 7 is close to the focal point 25 of the field lens 8, and just inside this focal point so that the field stop 7 is imaged on the object 12.

As first noted, the system shown in Fig. I has the advantage of simplicity of design, particularly of the vertical illuminator. For use with certain types of objectives, especially where absorption of light by the light control means 20 is not a problem, this simple design may be the most desirable.

If for structural or other reasons it is cumbersome to arrange the entrance pupil and accordingly the aperture on the remote side of the field stop iris, the aperture may be arranged between the field stop iris and the field lens while being effectively on the remote side of the field stop from the field lens. This can be accomplished by physically positioning the field stop in the more remote relation and imaging this stop in between the field lens and the ring stop. Fig. II illustrates such a modification of the optical syssystem of Fig. I.

In the optical system of Fig. II the objective 14, 15, 16, forms an image of the object 12 which can be observed through the eyepiece 18, 19 as with the optical system of Fig. I. Furthermore, the light modifying means such as the light modifying plate 20 is disposed at the exit pupil 23 of the composite system, the ring stop or aperture means 21 being disposed at the entrance pupil of the composite system. It will be noted that in order to effectively position the field stop iris at a position 26 between the aperture means 21 and the field lens 8a, an additional lens 27 is so arranged in the light directing lens system that the field stop iris 7 and the position 26 are respectively at conjugate points of the lens 27.

With this arrangement, although the field stop iris is actually on the remote side of the aperture means 21 from the field lens 8a, the additional lens 27 causes the field stop iris to be effectively positioned at 26 adjacent the focal point 25a and between the aperture means 21 and the field lens 8a. This may be of advantage where the entrance and exit pupils of the composite system could not otherwise be properly positioned.

In both of the foregoing examples, the light modifying means 20 is disposed between the semi-reflecting mirror 9 and the object 12. In Fig. III is illustrated an optical system which has the advantage that the light reflected by the semi-reflecting mirror for the purpose of illuminating the object need not pass through the light control means. As diagrammatically illustrated in Fig. III, an image of the object is formed by the objective including lenses 29 and 30 in the focal plane of the eyepiece including lenses 32 and 33. The lens system for directing light upon the object includes in place of the field lens 8 or 8a of Figs. I and II a pair of doublets 35 and 36. The ring stop or aperture means 21 is on the remote side of field stop iris 7 from the doublets 35 and 36. The lamp 5 has a filament 40 which is imaged by a condensing lens 38 at 40′ closely adjacent the aperture 21.

With this arrangement the field stop iris 7 is focused substantially upon the object. The filament image 40' is finally focused at 40''. The aperture means 21 is at the entrance pupil of the composite system made up of lenses 29, 30, 35, 36 functioning with the reflecting surface of the specimen. At the exit pupil 42 of this composite system is disposed the light control means such as a light modifying plate 20.

It will be noted that the lens system for directing light upon the object, and the lens system of the microscope objective have been correlated by the specularly reflecting surface of the specimen so that the above-mentioned exit pupil 42 is above the semi-reflecting mirror 9; and therefore, the light for illuminating the object does not pass through the plate 20. Under certain conditions therefore, the illumination of the object may be improved with this arrangement of optical system of the microscope.

Another arrangement of optical system which is illustrated in Fig. IV can be used where it is desirable to have the light modifying means above the semi-reflecting mirror of the vertical illuminator. A distinguishing charateristic of this arrangement of optical system is that the microscope objective including a front objective lens 44 and a rear objective lens 45 is infinity corrected so as to transmit substantially parallel light from the lens 44 to the lens 45 when the objective is focused upon the object. The semi-reflecting mirror of the vertical illuminator is disposed on the microscope axis 10 in this parallel light between the front and rear elements 44 and 45 of the microscope objective. The light from the light source 5 after passing through the condensing lens 6 is confined to the desired size of beam by the field stop iris 7. This field stop iris is adjacent and just inside the focal point 25b of the field lens 48, while the ring stop or aperture means 49 is on the remote side of the field stop from the field lens 48. With this design of optical system the filament of the lamp 5 is imaged at 46.

The ring stop or aperture means 49 is disposed at the entrance pupil of the composite system, and at the exit pupil 50 is disposed the light modifying means such as a light modifying plate 20. By properly locating the aperture means 49, the light modifying means 20 may be disposed in any location along the axis 10 between the front objective element 44 and the rear objective 45, with the result that by placing the light modifying means 20 above the semi-reflecting means 9, difficulty with absorption of light for illuminating the object may be avoided.

The light modifying means 20 may as above mentioned be of the continuously variable type disclosed in copending application Serial No. 681,066 filed July 2, 1946, now Patent No. 2,516,905 dated August 1, 1950. As representative of the type of light modifying plates which may also be used, we have shown in Figs. V and VI a plate 20, such as a plate of glass having parallel surfaces and carrying a two-layer annular coating 52. One of these layers is a light absorbing layer such as a metallic coating, and the other is a layer for changing the phase of the light waves passing therethrough such as a dielectric coating of which magnesium fluoride is an excellent example. In Figs. VII and VIII we have shown another form 20a of light modifying plate which may be used. In this form, a plate of glass having parallel surfaces carries a coating 54 of light absorbing material such as a metallic layer deposited everywhere except upon the annular area 55, and in said annular area 55 which is conjugate to the aperture in aperture means 21 is a coating for changing the phase of the light. A dielectric coating such as magnesium fluoride may be used for this purpose.

The two forms of light modifying plates shown in Figs. V, VI, VII and VIII are merely representative of a variety of combinations which as taught in the Osterberg and Schrader application Serial No. 456,726, now Patent No. 2,427,689, may be used as light modifying means at the exit pupil of the composite system.

In all of the diagrammatic illustrations of the invention, namely Figs. I, II, III and IV, a field stop iris has been provided, but the customary vertical illuminator aperture stop for controlling the intensity of the beam illuminating the object has been omitted. We may use various substitutes, well-known in the art, in place of such an aperture stop. For instance, a filter or ground glass disc may be inserted at 52 in the embodiment of the invention shown in Fig. I and may be similarly disposed in the forms shown in Figs. II, III and IV. If such an insert is not desirable, a variable resistance may be inserted in the current supply to the lamp so as to vary the filament voltage. Another arrangement which may be used is to insert at 52 a pair of polarizing discs such as the polarizing filters commercially available at the present time for various optical purposes. By varying the relation between the axes of polarization of the two polarizing discs or filters, the intensity of the light beam may be varied.

By means of our invention, the range of the phase contrast microscope technique as set forth in the German Patent No. 636,168 and in the Osterberg and Schrader application 456,726, now Patent No. 2,427,689, has been extended so as to be made applicable to the observation of specularly reflecting objects including microscopic particles such as diatoms, a bacterial suspension or the droplets of an emulsion as seen against the background of a specularly reflecting surface. In all of the forms of optical systems which we have now described, effectively the same modification of the image forming rays by interference between the undeviated spectra and the deviated spectra is made use of for improvement of contrast in the image formed by the microscope. Although the light does not pass through the object, there is the same interference effect due to the differential in amplitude ratio or the difference in phase between the deviated and undeviated spectra.

In all of the embodiments of the invention, an aperture such as a ring stop has been so arranged with relation to the lens system for directing light upon the object as to be disposed at the entrance pupil of the composite system including this lens system and the lens system for forming an image of the object. The light modifying means has in each instance been disposed at the exit pupil of this composite system. Preferably the aperture is disposed on the side of the field stop (or the image of the field stop) toward the source of illumination.

Either the aperture means or the light control means should preferably be adjustable so as to enable the microscopist to more accurately focus the one upon the other; and since the light control means may be in a more inaccessible location than the aperture means, the latter is preferably adjustable so as to be centerable and also movable longitudinally with relation to the optical axis of the vertical illuminator. As a preferred form of such an aperture means, we have shown one provided with an annular opening; but this annular form is not essential. Such contour as is selected for the aperture will generally be used also for the contour of the absorbing or phase changing portion of the light control means.

In accordance with certain arrangements of the optical system of the microscope according to our invention, the light modifying means at the exit pupil of the composite system is disposed above the semi-reflecting mirror with the resulting advantage that light for illuminating the object is not reduced due to absorption in the light modifying means.

While we have illustrated certain embodiments which our invention may assume, it will be understood that the same may be otherwise embodied and practiced within the scope of the following claims.

Having described our invention, we claim:

1. An optical system for examining objects of relatively low contrast and of the type producing deviated and undeviated spectra of the light rays reflected therefrom, said optical system comprising an objective and a semi-reflecting element in optical alignment along a first optical axis, condenser means having an optical axis intersecting said first optical axis substantially at the plane of said semi-reflecting element, said semi-reflecting element being angularly disposed relative to both of said optical axes so as to direct light coming from said condenser means through said objective for illuminating an object located substantially at a predetermined object plane on the side of said objective opposed to the semi-reflecting element, means providing a light source of predetermined dimensions and contour intersecting said second mentioned optical axis and disposed outwardly of said condenser means at the side thereof remote from said semi-reflecting element, said condenser means and said objective jointly forming a combined lens system for directing light from said light source onto said object, said light source being located substantially at the entrance pupil of said combined lens system, and light-modifying means intersecting said first optical axis at a location between said object plane and a conjugate image plane of said objective and substantially at the exit pupil of said combined lens system, said light-modifying means comprising a plurality of light transmitting areas intersecting the deviated and undeviated light rays reflected from said object and being transmitted by said objective toward said conjugate image plane, at least one of said areas having light absorption and retardation properties differing from another of said areas, and said one area being substantially geometrically similar in shape to the contour of said light source and of such a size and so located as to substantially coincide with the image of said light source formed by said objective after being reflected by said object, whereby at least one of the phase and amplitude characteristics existing between said deviated and undeviated light rays intercepted by said light-modifying means will be changed relative to the other to thereby alter the contrast effect in an image of said object at said conjugate image plane.

2. An optical system for examining objects of relatively low contrast and of the type producing deviated and undeviated spectra of the light rays reflected therefrom, said optical system comprising an objective and a semi-reflecting element in optical alignment along a first optical axis, condenser means having an optical axis intersecting said first optical axis substantially at the plane of said semi-reflecting element, said semi-reflecting element being angularly disposed relative to both of said optical axes so as to direct light coming from said condenser means through said objective for illuminating an object located substantially at a predetermined object plane on the side of said objective opposed to the semi-reflecting element, means providing a light source of predetermined dimensions and contour intersecting said second mentioned optical axis and disposed outwardly of said condenser means at the side thereof remote from said semi-reflecting element, said condenser means and said objective jointly forming a combined lens system for directing light from said light source onto said object, said objective having a conjugate image plane intersecting said first optical axis on the opposite side of said semi-reflecting element from said objective, said light source being located substantially at the entrance pupil of said combined lens system, and light-modifying means intersecting said first optical axis at a location between said object plane and said semi-reflecting element and substantially at the exit pupil of said combined lens system, said light-modifying means comprising a plurality of light transmitting areas intersecting the deviated and undeviated light rays reflected from said object and being transmitted by said objective toward said conjugate image plane, at least one of said areas having light absorption and retardation properties differing from another of said areas, and said one area being substantially geometrically similar in shape to the contour of said light source and of such a size and so located as to substantially coincide with the image of said light source formed by said objective after being reflected by said object, whereby at least one of the phase and amplitude characteristics existing between said deviated and undeviated light rays intercepted by said light-modifying means will be changed relative to the other to thereby alter the contrast effect in an image of said object at said conjugate image plane.

3. An optical system for examining objects of relatively low contrast and of the type producing deviated and undeviated spectra of the light rays reflected therefrom, said optical system comprising an objective and a semi-reflecting element in optical alignment along a first optical axis, condenser means having an optical axis intersecting said first optical axis substantially at the plane of said semi-reflecting element, said semi-reflecting element being angularly disposed relative to both of said optical axes so as to direct light coming from said condenser means through said objective for illuminating an object located substantially at a predetermined object plane on the side of said objective opposed to the semi-reflecting element, means providing a light source of predetermined dimensions and contour intersecting said second mentioned optical axis and disposed outwardly of said condenser means at the side thereof remote from semi-reflecting element, said condenser means and said objective jointly forming a combined lens system for directing light from said light source onto said object, said light source being located substantially at the entrance pupil of said combined lens system, and light-modifying means intersecting said first optical axis at a location between said semi-reflecting element and a conjugate image plane of said objective and substantially at the exit pupil of said combined lens system, said light-modifying means comprising a plurality of light transmitting areas intersecting the deviated and undeviated light rays reflected from said object and being transmitted by said objective toward said conjugate image plane, at least one of said areas having light absorption and retardation properties differing from another of said areas, and said one area being substantially geometrically similar in shape to the contour of said light source and of such a size and so located as to substantially coincide with the image of said light source formed by said objective after being reflected by said object, whereby at least one of the phase and amplitude characteristics existing between said deviated and undeviated light rays intercepted by said light-modifying means will be changed relative to the other to alter the contrast effect in an image of said object at said conjugate image plane.

HAROLD OSTERBERG.
HELEN JUPNIK.

REFERENCES CITED

The following references are of record in the file of this patent:

UNITED STATES PATENTS

| Number | Name | Date |
| --- | --- | --- |
| 1,784,425 | George | Dec. 9, 1930 |
| 1,943,510 | Bauersfield et al. | Jan. 16, 1934 |
| 2,105,671 | Roesch | Jan. 18, 1938 |
| 2,303,906 | Benford et al. | Dec. 1, 1942 |
| 2,418,602 | Richards | Apr. 8, 1947 |

FOREIGN PATENTS

| Number | Country | Date |
| --- | --- | --- |
| 636,168 | Germany | Oct. 7, 1936 |
| 100,631 | Switzerland | Aug. 1, 1943 |

OTHER REFERENCES

Chamot and Mason: Handbook of Chemical Microscopy, volume I, pages 126, 127; published by Wiley and Sons Inc. (1930), New York.